United States Patent
Vidyadhara et al.

(10) Patent No.: US 12,045,326 B2
(45) Date of Patent: Jul. 23, 2024

(54) SECURED COMMUNICATION PROTOCOL LAYER FOR AUTHENTICATED HARDWARE DATA ACCESS

(71) Applicant: Dell Products L.P., Round Rock, TX (US)

(72) Inventors: Sumanth Vidyadhara, Bangalore (IN); Karunakar Poosapalli, Telangana (IN); Bibby Yeh, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 17/864,724

(22) Filed: Jul. 14, 2022

(65) Prior Publication Data
US 2024/0020364 A1    Jan. 18, 2024

(51) Int. Cl.
*G06F 21/31*      (2013.01)
*G06F 21/54*      (2013.01)
*G06F 21/57*      (2013.01)

(52) U.S. Cl.
CPC .............. *G06F 21/31* (2013.01); *G06F 21/54* (2013.01); *G06F 21/572* (2013.01)

(58) Field of Classification Search
CPC ......... G06F 21/31; G06F 21/54; G06F 21/572
See application file for complete search history.

(56) References Cited

U.S. PATENT DOCUMENTS

| | | | |
|---|---|---|---|
| 7,908,656 B1 * | 3/2011 | Mu .................... | G06F 21/6218 726/22 |
| 10,824,349 B1 * | 11/2020 | Chan .................... | G06F 3/0673 |
| 11,461,247 B1 * | 10/2022 | Bolbenes ............ | G06F 12/1475 |
| 2004/0177243 A1 * | 9/2004 | Worley, Jr. ............ | G06F 9/5077 713/2 |
| 2005/0044363 A1 * | 2/2005 | Zimmer .............. | H04L 63/0823 713/170 |
| 2008/0005297 A1 * | 1/2008 | Kjos ....................... | H04L 67/08 709/223 |

(Continued)

OTHER PUBLICATIONS

Lu, Long, et al. "Blade: an attack-agnostic approach for preventing drive-by malware infections." Proceedings of the 17th ACM conference on Computer and communications security. 2010.*

(Continued)

*Primary Examiner* — Jimmy H Tran
(74) *Attorney, Agent, or Firm* — Jackson Walker L.L.P.

(57) ABSTRACT

A disclosed method installs an I/O trap protocol to provide an authentication callback function for handling I/O trap events. I/O trap events may include write operations accessing any of one or more identified I/O addresses. An I/O trap event may be registered with the authentication callback function for each of one or more identified I/O addresses. Original values of data may be stored in a memory resource. Any occurrences of an I/O trap event triggers the authentication callback function to perform I/O trap operations. The I/O trap operations may include determining whether the I/O trap event is associated with an approved driver and, if not, restoring data stored at the identified I/O address to an original value. Installing the I/O trap protocol may include installing the I/O trap protocol during a system management mode (SMM) phase of a UEFI boot sequence.

14 Claims, 4 Drawing Sheets

(56) References Cited

U.S. PATENT DOCUMENTS

| | | | | |
|---|---|---|---|---|
| 2011/0138166 A1* | 6/2011 | Peszek | G06F 21/575 | 713/2 |
| 2012/0047580 A1* | 2/2012 | Smith | G06F 21/53 | 726/26 |
| 2012/0084438 A1* | 4/2012 | Raleigh | H04L 63/1425 | 709/224 |
| 2012/0246441 A1* | 9/2012 | Usui | G06F 12/10 | 711/E12.078 |
| 2012/0255010 A1* | 10/2012 | Sallam | H04L 63/0227 | 726/24 |
| 2012/0255031 A1* | 10/2012 | Sallam | G06F 21/53 | 726/27 |
| 2013/0132690 A1* | 5/2013 | Epstein | G06F 12/145 | 711/159 |
| 2013/0312099 A1* | 11/2013 | Edwards | G06F 21/554 | 726/24 |
| 2015/0163248 A1* | 6/2015 | Epstein | G06F 21/53 | 726/1 |
| 2015/0199283 A1* | 7/2015 | Epstein | G06F 12/145 | 711/152 |
| 2016/0267030 A1* | 9/2016 | Stapleton | G06F 9/4812 | |
| 2016/0314067 A1* | 10/2016 | Medovich | G06F 12/1009 | |
| 2018/0004681 A1* | 1/2018 | Koufaty | G06F 12/1009 | |
| 2018/0025183 A1* | 1/2018 | Zimmer | G06F 21/575 | 713/193 |
| 2018/0113816 A1* | 4/2018 | Hellwig | G06F 21/53 | |
| 2019/0364048 A1* | 11/2019 | Callaghan | H04L 63/0815 | |
| 2020/0257521 A1* | 8/2020 | Jayakumar | G06F 9/4401 | |
| 2020/0301764 A1* | 9/2020 | Thoresen | G06F 9/45541 | |
| 2020/0320023 A1* | 10/2020 | Litichever | G06F 21/56 | |
| 2020/0409740 A1* | 12/2020 | Li | G06F 21/53 | |
| 2021/0026950 A1* | 1/2021 | Ionescu | G06F 9/30101 | |
| 2021/0081538 A1* | 3/2021 | Zimmer | G06F 21/57 | |
| 2021/0141903 A1* | 5/2021 | Jayakumar | G06F 8/65 | |
| 2021/0271604 A1* | 9/2021 | Cariello | G06F 12/0882 | |
| 2021/0389953 A1* | 12/2021 | Sharma | G06F 21/602 | |
| 2022/0114009 A1* | 4/2022 | Ismael | G06F 9/545 | |
| 2022/0334718 A1* | 10/2022 | Kim | G06F 3/0659 | |
| 2023/0229779 A1* | 7/2023 | Terpstra | G06F 21/575 | 713/2 |
| 2023/0289204 A1* | 9/2023 | Ismael | H04L 63/20 | |
| 2023/0333755 A1* | 10/2023 | Poosapalli | G06F 9/4403 | |

OTHER PUBLICATIONS

Ge, Xinyang, Hayawardh Vijayakumar, and Trent Jaeger. "Sprobes: Enforcing kernel code integrity on the trustzone architecture." arXiv preprint arXiv:1410.7747 (2014).*

Cheng, Yueqiang, Xuhua Ding, and Robert H. Deng. "DriverGuard: Virtualization-based fine-grained protection on i/o flows." ACM Transactions on Information and System Security (TISSEC) 16.2 (2013): 1-30.*

Willmann, Paul, Scott Rixner, and Alan L. Cox. "Protection strategies for direct access to virtualized {I/O} devices." 2008 USENIX Annual Technical Conference (USENIX ATC 08). 2008.*

* cited by examiner

SECURED COMMUNICATION PROTOCOL LAYER FOR AUTHENTICATED HARDWARE DATA ACCESS

TECHNICAL FIELD

The present disclosure relates to information handling systems and, more particularly, identifying security vulnerabilities in a system and taking action in response.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In at least some types of information handling systems, including, without limitation, server-class, desktop, and/or laptop information handling systems, a basic input/output system (BIOS), which provides a layer of abstraction between system hardware and a runtime operating system (OS), is loaded into system memory as part of a boot process performed following a system reset. The boot process may comply with one or more versions of the Unified Extensible Firmware Interface (UEFI) specification that will be familiar to those of ordinary skill in the field.

Historically, at least some BIOS configuration attributes have been be stored in nonvolatile storage registers, commonly referred to as complementary metal-oxide silicon (CMOS) registers, accessible via pre-defined I/O addresses, also referred to as port addresses. In addition, information handling system manufacturers and distributors may employ some I/O addresses to implement vendor-specific and/or vendor-agnostic information and/or functionality. Unfortunately, however, CMOS registers and other I/O addresses may be read/write accessible to unintended drivers and other modules during pre-boot and/or runtime, potentially enabling an unauthorized module to set modify data in a way that could result in significant down time and could require physical replacement of a motherboard for resolution.

SUMMARY

Teachings disclosed herein address limitations associated with the absence of a secure authentication method that prevents unauthorized drivers from accessing I/O ports in conventional UEFI BIOS implementations. Disclosed method install an I/O trap protocol to provide an authentication callback function for handling I/O trap events. I/O trap events may include write operations accessing any of one or more identified I/O addresses. An I/O trap event may be registered with the authentication callback function for each of one or more identified I/O addresses. Original values of data may be stored, in a memory resource. Any occurrences of an I/O trap event triggers the authentication callback function to perform I/O trap operations. The I/O trap operations may include determining whether the I/O trap event is associated with an approved driver and, if the I/O trap is not associated with an approved driver, restoring data stored at the identified I/O address to an original value.

Installing the I/O trap protocol may include installing the I/O trap protocol during a system management mode (SMM) phase (SMM) of a UEFI boot sequence. The identified I/O addresses may include a pair of I/O addresses associated with one or more CMOS registers. The pair of I/O addresses may include a CMOS index I/O address and a CMOS data I/O address.

In at least some embodiments, determining whether the I/O trap event is associated with an approved driver includes determining whether the I/O trap event is associated with a basic I/O system (BIOS) driver. Determining whether the I/O trap event is associated with a basic I/O system (BIOS) driver may include determining a device path node for the caller, determining a device path type associated with the device path node, and responsive to determining that the device path type is not a BIOS driver device path, returning to the caller an indication of invalid or unsupported driver to the caller. If the device path type is a BIOS driver device path or another authorized device path, the caller may be permitted to access native read/write services to get or set data for the identified I/O address. In some embodiments, wherein determining the device path node for the caller comprises determining a name for the caller using a suitable EFI COMPONENT NAME2 PROTOCOL.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
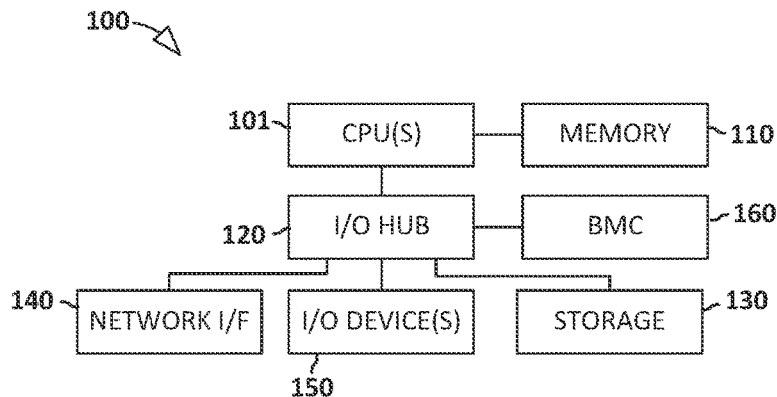
FIG. 1 illustrates an exemplary information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

At least one embodiment encompasses a method to prevent unauthorized access to one or more identified I/O addresses of an information handling system. In at least one exemplary implementation, the identified I/O addresses include a pair of I/O addresses corresponding to the system's CMOS registers, which may contain vendor-specific flags and other data. More generally, however, disclosed methods may identify and prevent unauthorized access to any I/O address. Because valid write operations to CMOS and other vendor-specific and/or platform-specific registers typically only occur within "early-boot" modules, also referred to herein as BIOS modules or BIOS drivers, some embodiments may determine the validity of an I/O address access attempt based on whether the calling module is a recognized BIOS driver or whether the device path type of the calling driver is compatible with a BIOS driver. For purposes of the present disclosure, the terms early-boot modules and/or BIOS modules may refer to any module that executes during a PEI phase of a UEFI boot sequence or during a portion of a DXE phase of the UEFI boot sequence that executes before a system management mode (SMM) is established.

Thus, disclosed methods may dynamically validate and authenticate I/O address accesses to prevent unauthorized modifications of I/O address data, including CMOS register data, initiated from a non-BIOS driver, module, or caller to prevent, as an example, malware modifications of vendor-specific flags and data in any of the I/O address registers/hardware. Disclosed methods may also implement a solution for validating a device path for any data access/writes calls using UEFI Device path protocol. The device path of the caller is parsed to identify whether the driver is from pre boot, PEI, DXE, or SMM drivers or outside BIOS modules. Based on a device path created if the caller is outside BIOS, this method implements failover mechanism or rollback to original values.

Referring now to FIG. 1, any one or more of the elements illustrated in FIG. 2 through FIG. 5 may be implemented as or within an information handling system exemplified by the information handling system 100 illustrated in FIG. 1. The illustrated information handling system includes one or more general purpose processors or central processing units (CPUs) 101 communicatively coupled to a memory resource 110 and to an input/output hub 120 to which various I/O resources and/or components are communicatively coupled. The I/O resources explicitly depicted in FIG. 1 include a network interface 140, commonly referred to as a NIC (network interface card), storage resources 130, and additional I/O devices, components, or resources 150 including as non-limiting examples, keyboards, mice, displays, printers, speakers, microphones, etc. The illustrated information handling system 100 includes a baseboard management controller (BMC) 160 providing, among other features and services, an out-of-band management resource which may be coupled to a management server (not depicted). In at least some embodiments, BMC 160 may manage information handling system 100 even when information handling system 100 is powered off or powered to a standby state. BMC 160 may include a processor, memory, an out-of-band network interface separate from and physically isolated from an in-band network interface of information handling system 100, and/or other embedded information handling resources. In certain embodiments, BMC 160 may include or may be an integral part of a remote access controller (e.g., a Dell Remote Access Controller or Integrated Dell Remote Access Controller) or a chassis management controller.

Figure 2:
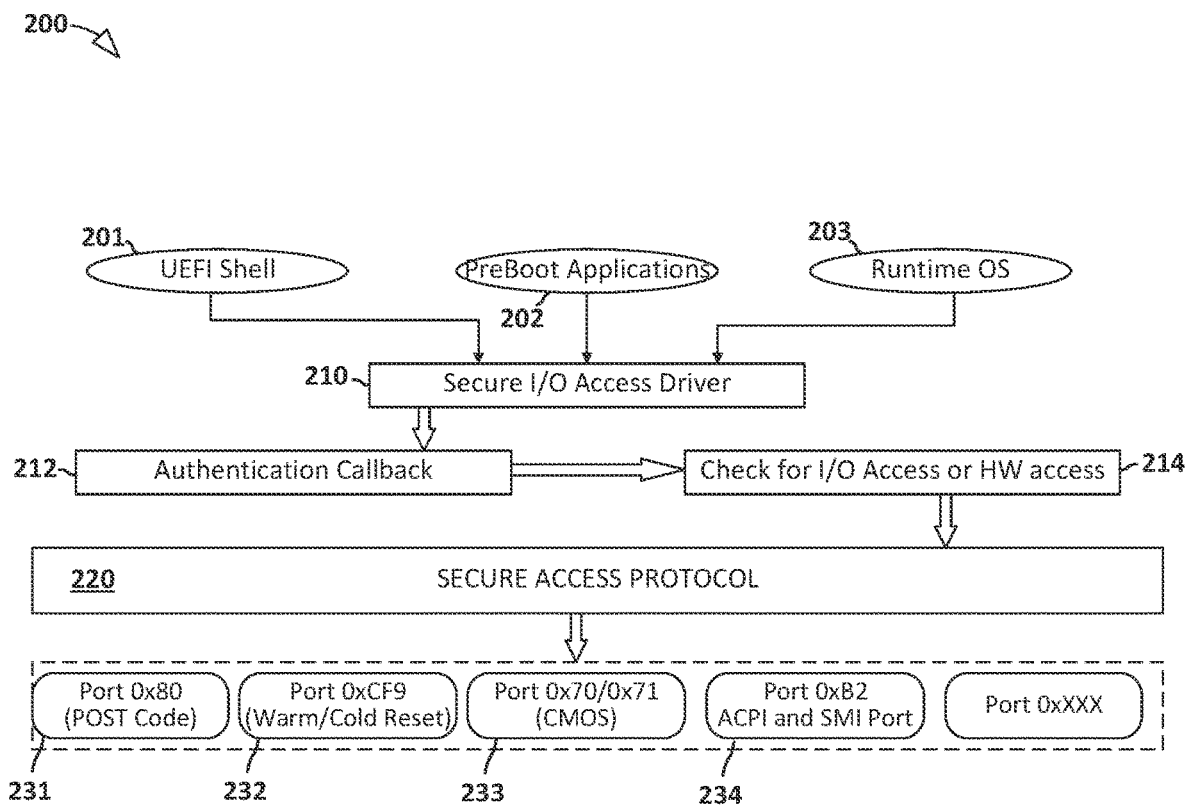
FIG. 2 illustrates a secure access resource of an information handling system.

Referring now to FIG. 2, a secure I/O access resource 200 in accordance with disclosed teachings is depicted. The secure I/O access resource 200 illustrated in FIG. 2 is enabled to detect write access operations to any of one or more identified I/O addresses, determine if a detected operation was requested by an unauthorized caller, and, if so, take action appropriate to prevent the unauthorized caller from modifying data stored at the identified I/O address or addresses. In some embodiments, an unauthorized caller may include any driver or other module that is not a BIOS driver or BIOS module. In such embodiments, UEFI shell applications 201, other pre-boot applications 202, and run-time OS modules 203, may all constitute unauthorized modules.

FIG. 2 further illustrates a secure I/O access driver 210, which may receive notification of any I/O access event, i.e., any write operation to an identified I/O address. If secure I/O access driver 210 determines that the I/O access event originated from a non-BIOS caller, an authentication callback 212 may be triggered. Authentication callback 212 may check (operation 214) to determine whether an I/O address access was from an unauthorized module. If the I/O address access was initiated by an unauthorized module, a secure access protocol 220 may implement an I/O trap service and provide a dynamic callback mechanism, described in more detail in the description of FIG. 3, FIG. 4, and FIG. 5, to register any I/O address for validation and authentication against unauthorized modules.

FIG. 2 further illustrates representative I/O addresses that may corresponded to one or more vendor-specific I/O addresses used for various purposes. The I/O addresses explicitly depicted in FIG. 2 include a power on self test (POST) code I/O address 231 (hexadecimal address 0x80), A warm/cold reset I/O address 232 (0xCF9), a CMOS port address pair 233, including I/O address 0x70 corresponding to the CMOS index and I/O address 0x71 for CMOS data, an Advanced Configuration and Power Interface (ACPI) and Serial Management Interface (SMI) I/O address 234 (0xB2), and so forth. While the particular I/O addresses illustrated in FIG. 2 may be representative of vendor-specific I/O addresses for vendor-specific flags and other data, it will be appreciated that the illustrated I/O addresses are representative and that in other implementations, other I/O addresses may be included in the I/O addresses identified for authenticated and secured access.

Figure 3:
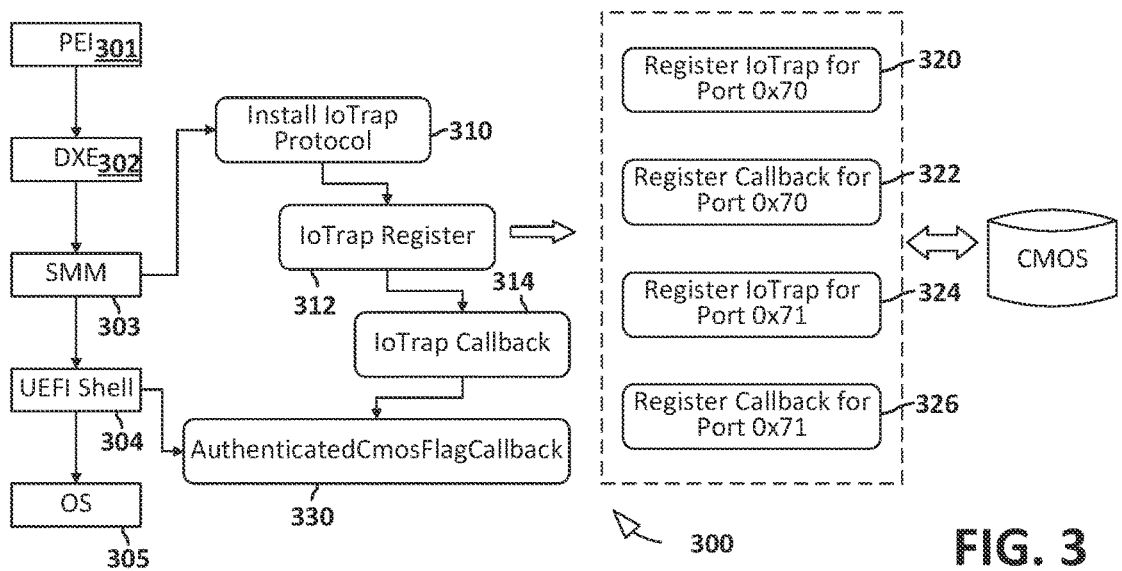
FIG. 3 illustrates a secure access protocol suitable for use in the secure access resource of FIG. 2.

Referring now to FIG. 3, a secure I/O access resource 300, building on the secure I/O access resource 200 of FIG. 2, provides a secure communication layer and installs an I/O trap service for enabling authenticated access to CMOS registers and any other I/O address is depicted. The secure I/O access resource 300 depicted in FIG. 3 may install the I/O trap service protocol during POST and provide a dynamic call back mechanism to register, for any I/O address, write access validation and authentication of unauthorized modules. In some embodiments, all modules executing after an early part of a UEFI boot sequence may be considered unauthorized for purposes of I/O address access.

The secure I/O access resource 300 illustrated in FIG. 3 may be used to ensure correct values for CMOS registers and other I/O address data while the registered callback function may provide a method to save vendor specific data values before any write occurs to the specific register. In at least some embodiments, vendor specific flags and CMOS registers are only intended to be read and written during early pre-boot. In these embodiments all other applications represent untrusted applications that are not allowed to change vendor-specific flags or other CMOS data.

The callback function may preserve the right value following a write access by an unauthorized module by retrieving the original value and writing back the original value to the applicable CMOS register or other I/O address. In this manner, secure I/O access resource 300 may be invoked to protect vendor-specific flags, whether maintained in CMOS registers or other I/O addresses, from modification by unauthorized modules or tools.

As depicted in FIG. 3, phases of a UEFI boot sequence including PEI phase 301, DXE phase 302, SMM phase 303, UEFI shell phase 304, and OS or runtime phase 305 are depicted to indicate exemplary timing for the illustrated actions. FIG. 3 depicts a specific example in which the I/O addresses identified for authenticated access are I/O addresses 0x70 and 0x71 corresponding to the CMOS index and data registers that will be familiar to those of ordinary skill in the field. The selection of I/O addresses for the CMOS registers is by way of example and does not limit the described functionality to any specific I/O address or addresses.

As depicted in FIG. 3 an I/O trap protocol 310, with an I/O trap register 312 and an I/O trap callback 314, is installed during SMM phase 303. Once the I/O trap protocol is installed, an OEM driver (not explicitly depicted in FIG. 3) may register (operation 320) an I/O trap for I/O address 0x70 (CMOS index), register (operation 322) a callback for I/O address 0x70, register (operation 324) an I/O trap for I/O address 0x71 (CMOS data) and register (operation 326) a callback for I/O address 0x71. The callback registered in operations 322 and 326 is represented in FIG. 3 by the AuthenticatedCmosFlagCallback 330.

Figure 4:
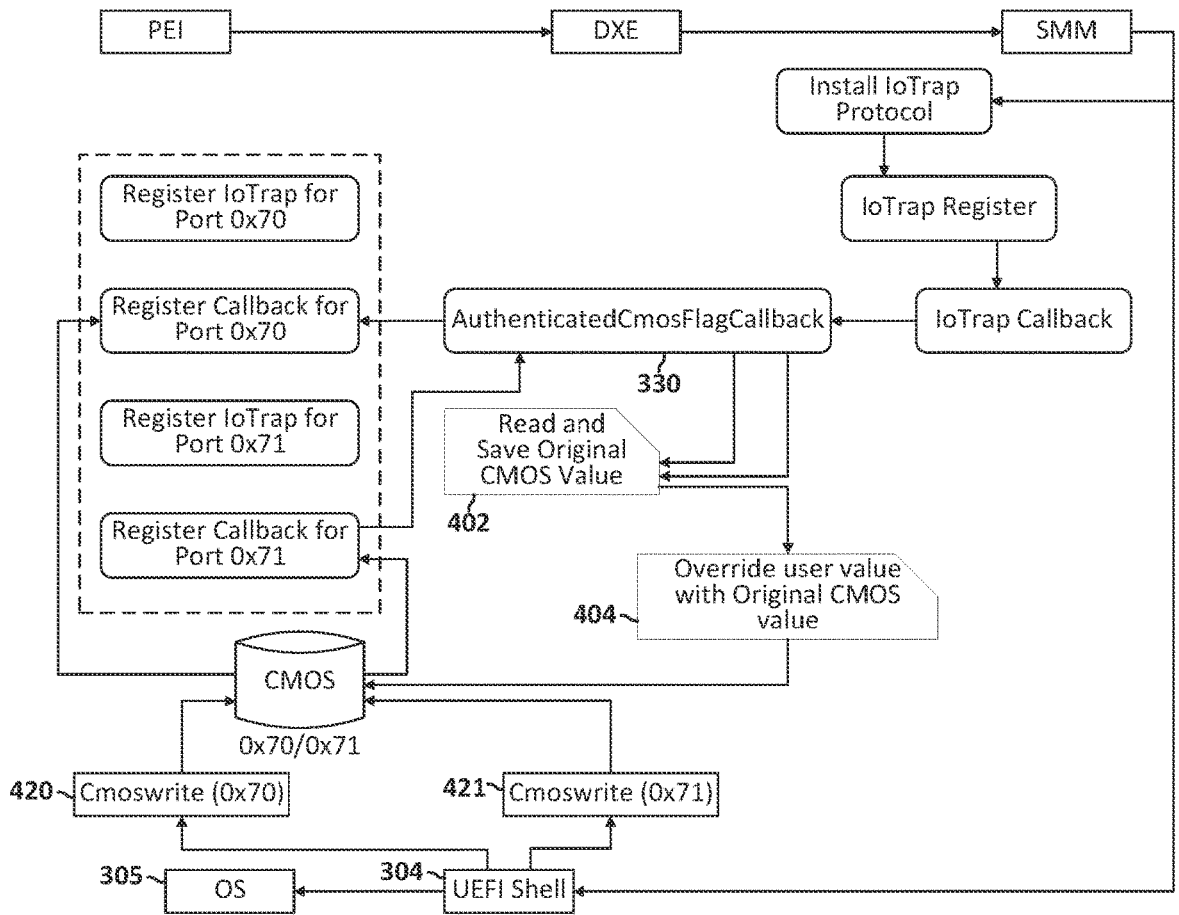
FIG. 4 illustrates operation of the secure access resource of FIG. 3 for a particular I/O access.

Referring now to FIG. 4, operation of the authenticated access resource 300 of FIG. 3 is depicted for the particular example of an access to I/O addresses 0x70 and 0x71 during UEFI shell phase 304. When a write operation to an identified I/O address, such as the write operations 420 and 421 depicted in FIG. 4, originate from an unauthorized module such as a module executing from UEFI shell 304 or the runtime OS 305, AuthenticatedCmosFlagCallback 330 is triggered to read and save (operation 402) the original value stored in the applicable CMOS data register. When the unauthorized module writes to the identified I/O address, AuthenticatedCmosFlagCallback 330 may retrieve (operation 404) the original value from storage (not explicitly depicted in FIG. 4) and saved back to the CMOS register.

Figure 5:
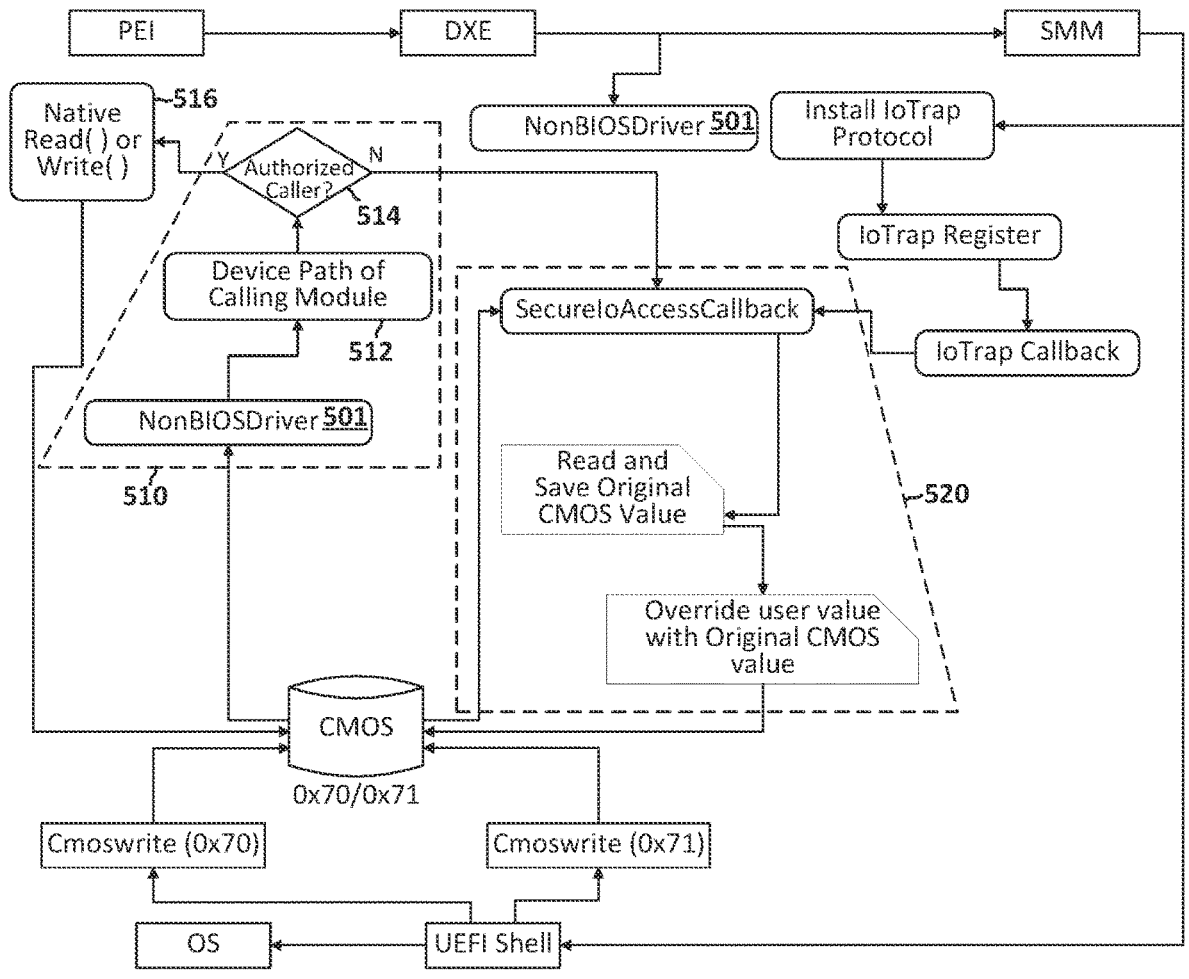
FIG. 5 illustrates another secure access resource.

Referring now to FIG. 5, the secure I/O access resource 300 of FIG. 3 and FIG. 4 is extended to provide an exemplary secure I/O access resource 500. The secure I/O access resource 500 includes, in addition to the elements of secure access resource 300, a driver, referred to herein as NonBIOSDriver 501, for authenticating I/O address accesses from non-BIOS callers, which may be installed or invoked during DXE phase 302. As depicted in FIG. 5, when a runtime module, driver, or other caller accesses and attempts to modify an identified I/O address, NonBIOSDriver 501 may authenticate (operations 510) the caller and invoke secure communication layer 520 to protect identified I/O addresses.

In at least some embodiments of authentication operations 510, NonBIOSDriver 501 may provide services to determine (512) a device path for a call to an identified I/O address. In at least some embodiments, NonBIOSDriver 501 parses the device path of the caller to identify whether the caller is a preboot caller, e.g., a PEI, DXE, or SMM phase caller or a non-BIOS caller, e.g., a caller from UEFI shell or during OS runtime. Based at least in part on the device path, if the caller is a non-BIOS driver, the NonBIOSdriver 501 may invoked secure authenticated layer 520 to prevent unauthorized modification of identified I/O addresses. If the caller or driver is from an authenticated BIOS module then NonBIOSDriver will permit (operation 514) the caller to access native I/O access read( ) and write( ) methods (516) to read and modify the requested data. With this method, vendor flags in I/O ports or hardware are secured and cannot be modified by any unauthorized applications or tools thereby minimizing or reducing unwanted BIOS recoveries and system corruptions that can result in potential attacks at customer platforms. Disclosed methods can be implemented for any port access and callback services to prevent unauthorized writes to any port data.

In at least some embodiments, NonBIOSDriver module 501 creates a secured communication layer that provides a mechanism to authenticate the caller. When any caller tries to retrieve or modify vendor-specific flags or data, this driver may validate the input parameters and authenticate the caller with various methods, of which the following is an example.

NonBIOSDriver 501 may determine caller details using an EFI COMPONENT NAME2 PROTOCOL to get the caller driver or controller name. After parsing the driver name, the device path of the caller driver or module can be determined. Based on device path and its nodes, the device can be validated based on its EFI node type. For most BIOS drivers including, as examples, DXE, SMM or ACPI callbacks, the device path will be, for example, a media device path, an ACPI device path, or the like. When the device node of the caller is not part of BIOS drivers, the method will return an invalid or unsupported driver error message. If the device node type of calling driver is USB type, the caller may be from a UEFI shell application or any other media. NonBIOSDriver 501 may reject non authenticated get variables calls and return unknown device to prevent unknown drivers from reading port data. When this driver returns a fails as unauthenticated module or driver, it may internally call a secured authenticated callback to prevent hardware or port data and failover mechanism to save the original data.

Figure 6:
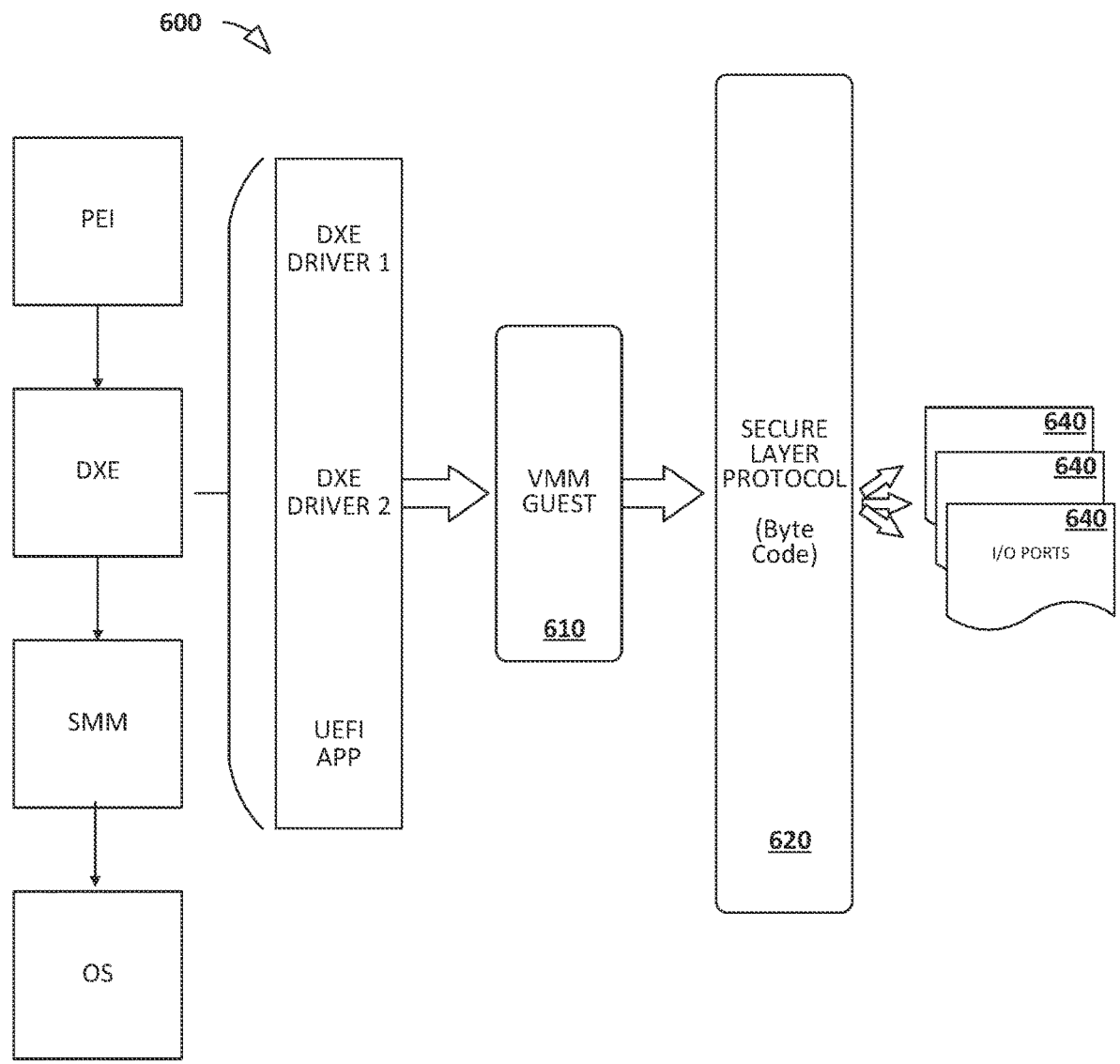
FIG. 6 illustrates a secure access resources implemented with byte code and a virtual machine monitor.

FIG. 6 illustrates a secure I/O address access resource 600 implemented with secure layer byte code 620 and a Virtual Machine Monitor (VMM). The illustrated secure I/O access resource 600 implements a mechanism to access identified I/O addresses securely for all pre-boot BIOS drivers or applications and runtime modules. The illustrated resource may use a VMM host (not explicitly depicted) to control the platform hardware for I/O ports 640. A VMM Guest 610 may have access to I/O hardware. After the I/O access is authenticated, VMM guest 610 may give control to secure layer protocol 620. I/O address access will be selectively control based on the callers with I/O protection done using I/O bitmapping. If any driver or guest accesses an identified I/O address, a VM callback will be triggered and the VM may use secure layer protocol 620 to authenticate the caller and restrict authorized I/O address access. The VM callback may invoke an OEM callback to save I/O address data. Saved data may then be used to rollback to an original value once the write operation is completed.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method:
installing an input/output (I/O) trap protocol, wherein the I/O trap protocol provides an authentication callback function for handling I/O trap events comprising write operations accessing any of one or more identified input/output (I/O) addresses;
registering an I/O trap event and the authentication callback function for each of one or more identified I/O addresses;
storing, in a memory resource, original values of data stored in each of the one or more identified I/O addresses;
wherein an occurrence of an I/O trap event triggers the authentication callback function to perform I/O trap operations, wherein the I/O trap operations include:
determining whether the I/O trap event is associated with an approved driver; and
responsive to determining that the I/O trap event is not associated with an approved driver, restoring data stored at the identified I/O address to an original value.

2. The method of claim 1, where installing the I/O trap protocol comprising installing the I/O trap protocol during a system management mode (SMM) phase of a Unified Extensible Firmware Interface (UEFI) boot sequence.

3. The method of claim 1, wherein the identified I/O addresses include a pair of I/O addresses associated with one or more complementary metal oxide semiconductor (CMOS) registers, wherein the pair of I/O addresses include a CMOS index I/O address and a CMOS data I/O address.

4. The method of claim 1, wherein determining whether the I/O trap event is associated with an approved driver comprises determining whether the I/O trap event is associated with a basic I/O system (BIOS) driver.

5. The method of claim 4, wherein determining whether the I/O trap event is associated with a BIOS driver comprises:
determining a device path node for the caller;
determining a device path type associated with the device path node;
responsive to determining that the device path type is not a BIOS driver device path, returning to the caller an indication of invalid or unsupported driver to the caller.

6. The method of claim 5, further comprising, if the device path type is a BIOS driver device path, allowing the caller to access native read/write services to get or set data for the identified I/O address.

7. The method of claim 5, wherein determining the device path node for the caller comprises determining a name for the caller using an EFI COMPONENT NAME2 PROTOCOL.

8. An information handing system, comprising:
a central processing unit (CPU); and
a memory, accessible to the CPU, including processor-executable instructions that, when executed by the CPU, cause the system to perform operations comprising:
installing an input/output (I/O) trap protocol, wherein the I/O trap protocol provides an authentication callback function for handling I/O trap events comprising write operations accessing any of one or more identified I/O addresses;
registering an I/O trap event and the authentication callback function for each of one or more identified I/O addresses;
storing, in a memory resource, original values of data stored in each of the one or more identified I/O addresses;
wherein an occurrence of an I/O trap event triggers the authentication callback function to perform I/O trap operations, wherein the I/O trap operations include:
determining whether the I/O trap event is associated with an approved driver; and
responsive to determining that the I/O trap event is not associated with an approved driver, restoring data stored at the identified I/O address to an original value.

9. The information handling system of claim 8, where installing the I/O trap protocol comprising installing the I/O trap protocol during a system management mode (SMM) phase of a Unified Extensible Firmware Interface (UEFI) boot sequence.

10. The information handling system of claim 8, wherein the identified I/O addresses include a pair of I/O addresses associated with one or more (CMOS)registers, wherein the pair of I/O addresses include a CMOS index I/O address and a CMOS data I/O address.

11. The information handling system of claim 8, wherein determining whether the I/O trap event is associated with an approved driver comprises determining whether the I/O trap event is associated with a basic I/O system (BIOS) driver.

12. The information handling system of claim 11, wherein determining whether the I/O trap event is associated with a basic I/O system (BIOS) driver comprises:
determining a device path node for the caller;
determining a device path type associated with the device path node;

responsive to determining that the device path type is not a BIOS driver device path, returning to the caller an indication of invalid or unsupported driver to the caller.

13. The information handling system of claim 12, further comprising, if the device path type is a BIOS driver device path, allowing the caller to access native read/write services to get or set data for the identified I/O address.

14. The information handling system of claim 12, wherein determining the device path node for the caller comprises determining a name for the caller using an EFI COMPONENT NAME2 PROTOCOL.

* * * * *